US011510184B2

(12) United States Patent
Huang et al.

(10) Patent No.: US 11,510,184 B2
(45) Date of Patent: Nov. 22, 2022

(54) PHYSICAL UPLINK CONTROL CHANNEL REPETITION

(71) Applicant: QUALCOMM Incorporated, San Diego, CA (US)

(72) Inventors: Yi Huang, San Diego, CA (US); Wanshi Chen, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/457,473

(22) Filed: Jun. 28, 2019

(65) Prior Publication Data

US 2020/0015222 A1 Jan. 9, 2020

Related U.S. Application Data

(60) Provisional application No. 62/693,803, filed on Jul. 3, 2018.

(51) Int. Cl.
*H04W 72/04* (2009.01)

(52) U.S. Cl.
CPC ....... *H04W 72/0413* (2013.01); *H04W 72/04* (2013.01)

(58) Field of Classification Search
CPC .............. H04W 72/0413; H04W 72/04; H04L 5/0053; H04L 1/08
See application file for complete search history.

(56) References Cited

U.S. PATENT DOCUMENTS

| 11,139,930 | B2* | 10/2021 | Wang ................... H04L 1/189 |
| 2008/0318608 | A1* | 12/2008 | Inoue ................. H04L 27/2613 |
| | | | 455/509 |
| 2018/0026663 | A1* | 1/2018 | Wu .................... H03M 13/6362 |
| | | | 714/776 |
| 2018/0124815 | A1* | 5/2018 | Papasakellariou .... H04L 5/0053 |
| 2018/0139774 | A1* | 5/2018 | Ma .................... H04W 72/1289 |
| 2018/0183552 | A1* | 6/2018 | Hosseini ................ H04L 5/0092 |
| 2018/0278371 | A1* | 9/2018 | Chien ................... H04L 1/0009 |
| 2018/0331807 | A1* | 11/2018 | Kim ........................ H04L 29/06 |
| 2019/0045533 | A1* | 2/2019 | Chatterjee .......... H04W 72/0446 |

(Continued)

OTHER PUBLICATIONS

Intel, "Long PUCCH over multiple slots", 3GPP TSG RAN WG1 Meeting #90, R1-1712581, Prague, P. R. Czechia, Aug. 21-25, 2017, 5 Pages (Year: 2017).*

(Continued)

*Primary Examiner* — Ivan O Latorre
(74) *Attorney, Agent, or Firm* — Qualcomm Incorporated

(57) ABSTRACT

Various aspects of the present disclosure generally relate to wireless communication. In some aspects, a base station may transmit, in connection with an ultra-reliable low latency communication service, a configuration message to configure transmission of a physical uplink control channel for the ultra-reliable low latency communication service. In some aspects, a user equipment may receive the configuration message. In some aspects, the user equipment may transmit, in a single slot, a plurality of repetitions of the physical uplink control channel based at least in part on receiving the configuration message. In some aspects, the base station may receive the plurality of repetitions. Numerous other aspects are provided.

37 Claims, 7 Drawing Sheets

(56) References Cited

U.S. PATENT DOCUMENTS

| | | | |
|---|---|---|---|
| 2019/0052421 A1* | 2/2019 | Yin | H04B 1/713 |
| 2019/0053211 A1* | 2/2019 | Ying | H04W 72/044 |
| 2019/0097762 A1* | 3/2019 | Jeon | H04W 28/04 |
| 2019/0150143 A1* | 5/2019 | Yin | H04L 1/1861 370/329 |
| 2019/0223205 A1* | 7/2019 | Papasakellariou | H04L 5/00 |
| 2019/0261391 A1* | 8/2019 | Kundu | H04W 72/0446 |
| 2019/0313342 A1* | 10/2019 | Papasakellariou | H04W 52/48 |
| 2019/0356449 A1* | 11/2019 | Yoshimura | H04L 5/0053 |
| 2020/0015200 A1* | 1/2020 | Vilaipornsawai | H04L 25/0204 |
| 2020/0037314 A1* | 1/2020 | Xiong | H04L 5/0091 |
| 2020/0145143 A1* | 5/2020 | Nemeth | H04W 72/0406 |
| 2020/0236699 A1* | 7/2020 | Nakashima | H04W 72/1289 |
| 2020/0404692 A1* | 12/2020 | Yin | H04L 1/1854 |
| 2021/0037519 A1* | 2/2021 | Matsumura | H04W 72/0413 |
| 2021/0045110 A1* | 2/2021 | Froberg Olsson | H04L 5/0044 |
| 2021/0058922 A1* | 2/2021 | Han | H04L 1/1664 |
| 2021/0126753 A1* | 4/2021 | Mochizuki | H04L 5/0037 |
| 2021/0377937 A1* | 12/2021 | Takeda | H04L 1/1812 |

OTHER PUBLICATIONS

China Telecom: "On NR PUCCH Demodulation Requirements", 3GPP TSG RAN WG4 Meeting AH-1807, 3GPP Draft; R4-1808609_PUCCH DEMOD, 3rd Generation Partnership Project (3GPP), Mobile Competence Centre, 650, Route Des Lucioles; F-06921 Sophia-Antipolis Cedex, France, vol. Ran WG4, No. Montreal, CA; Jun. 2, 2018-Jul. 6, 2018, Jul. 1, 2018 (Jul. 1, 2018), pp. 1-4, XP051468507, Retrieved from the Internet: URL: http://www.3gpp.org/ftp/Meetings_3GPP_SYNC/RAN4/Docs/ [retrieved on Jul. 1, 2018].

ETRI: "Remaining Issues for UCI Repetition", 3GPP TSG RAN WG1 Meeting #92bis, 3GPP Draft; R1-1804493 Remaining Issues for UCI Repetition—Final, 3rd Generation Partnership Project (3GPP), Mobile Competence Centre, 650, Route Des Lucioles, F-06921 Sophia-Anti Polis Cedex, France, vol. RAN WG1, No. Sanya, China; Apr. 16, 2018-Apr. 20, 2018, Apr. 15, 2018 (Apr. 15, 2018), pp. 1-4, XP051426763, Retrieved from the Internet: URL: http://www.3gpp.org/ftp/Meetings_3GPP_SYNC/RAN1/Docs/ [retrieved on Apr. 15, 2018].

International Search Report and Written Opinion—PCT/US2019/040159—ISA/EPO—Sep. 24, 2019.

Lenovo et al., "Remaining Issues on UCI Multiplexing on PUCCH", 3GPP Draft; R1-1806336 Remaining Issues on UCI Multiplexing on PUCCH_Final, 3rd Generation Partnership Project (3GPP), Mobile Competence Centre, 650, Route Des Lucioles, F-06921 Sophia-Anti Polis Cedex, France, vol. RAN WG1, No. Susan, Korea; May 21, 2018-May 25, 2018, May 20, 2018 (May 20, 2018), 5 Pages, XP851441541, Retrieved from the Internet: URL: http://www.3gpp.org/ftp/Meetings_3GPP_SYNC/RAN1/Docs/[retrieved on May 20, 2018].

Nokia et al., "Release 16 NR URLLC Enhancements: Company Positions on Technical Proposals", 3GPP TSG-RAN Meeting #80, 3GPP Draft; RP-180974, 3rd Generation Partnership Project (3GPP), Mobile Competence Centre, 650, Route Des Lucioles; F-06921 Sophia-Antipolis Cedex, France, vol. TSG RAN, No. La Jolla, US; Jun. 11, 2018-Jun. 14, 2018, Jun. 4, 2018 (Jun. 4, 2018), pp. 1-33, XP051455392, Retrieved from the Internet: URL: http://www.3gpp.org/ftp/Meetings_3GPP_SYNC/RAN/Docs/ [retrieved on Jun. 4, 2018].

NTT Docomo et al., WI Summary of New Radio Access Technology, 3GPP TSG-RAN Meeting #80, 3GPP Draft; RP-181466 WI Summary, 3rd Generation Partnership Project (3GPP), Mobile Competence Centre, 650, Route Des Lucioles; F-06921 Sophia-Antipolis Cedex, France, vol. TSG RAN, No. La Jolla, US; Jun. 11, 2018-Jun. 14, 2018, Jun. 15, 2018 (Jun. 15, 2018), 13 Pages, XP051512107, Retrieved from the Internet: URL: https://www.3gpp.org/ftp/tsg_ran/TSG_RAN/TSGR_80/Docs/RP-181466.zip [retrieved on Jun. 15, 2018].

* cited by examiner

PHYSICAL UPLINK CONTROL CHANNEL REPETITION

CROSS-REFERENCE TO RELATED APPLICATIONS UNDER 35 U.S.C. § 119

This application claims priority to U.S. Provisional Patent Application No. 62/693,803, filed on Jul. 3, 2018, entitled "TECHNIQUES AND APPARATUSES FOR PHYSICAL UPLINK CONTROL CHANNEL REPETITION," which is hereby expressly incorporated by reference herein.

FIELD OF THE DISCLOSURE

Aspects of the present disclosure generally relate to wireless communication, and to techniques and apparatuses for physical uplink control channel repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication, performed by a user equipment (UE), may include receiving, in connection with an ultra-reliable low latency communication service, a configuration message to configure transmission of a physical uplink control channel for the ultra-reliable low latency communication service. The method may include transmitting, in a single slot, a plurality of repetitions of the physical uplink control channel based at least in part on receiving the configuration message.

In some aspects, a user equipment for wireless communication may include memory and one or more processors operatively coupled to the memory. The memory and the one or more processors may be configured to receive, in connection with an ultra-reliable low latency communication service, a configuration message to configure transmission of a physical uplink control channel for the ultra-reliable low latency communication service. The memory and the one or more processors may be configured to transmit, in a single slot, a plurality of repetitions of the physical uplink control channel based at least in part on receiving the configuration message.

In some aspects, a non-transitory computer-readable medium may store one or more instructions for wireless communication. The one or more instructions, when executed by one or more processors of a user equipment, may cause the one or more processors to receive, in connection with an ultra-reliable low latency communication service, a configuration message to configure transmission of a physical uplink control channel for the ultra-reliable low latency communication service. The one or more instructions, when executed by the one or more processors of the user equipment, may cause the one or more processors to transmit, in a single slot, a plurality of repetitions of the physical uplink control channel based at least in part on receiving the configuration message.

In some aspects, an apparatus for wireless communication may include means for receiving, in connection with an ultra-reliable low latency communication service, a configuration message to configure transmission of a physical uplink control channel for the ultra-reliable low latency communication service. The apparatus may include means for transmitting, in a single slot, a plurality of repetitions of the physical uplink control channel based at least in part on receiving the configuration message.

In some aspects, a method for wireless communication, performed by a base station (BS), may include transmitting, in connection with an ultra-reliable low latency communication service, a configuration message to configure transmission of a physical uplink control channel for the ultra-reliable low latency communication service. The method may include receiving a plurality of repetitions of the physical uplink control channel transmitted in a single slot based at least in part on transmitting the configuration message.

In some aspects, a base station for wireless communication may include memory and one or more processors operatively coupled to the memory. The memory and the one or more processors may be configured to transmit, in connection with an ultra-reliable low latency communication service, a configuration message to configure transmission of a physical uplink control channel for the ultra-reliable low latency communication service. The memory and the one or more processors may be configured to receive a plurality of repetitions of the physical uplink control channel transmitted in a single slot based at least in part on transmitting the configuration message.

In some aspects, a non-transitory computer-readable medium may store one or more instructions for wireless communication. The one or more instructions, when executed by one or more processors of a base station, may cause the one or more processors to transmit, in connection with an ultra-reliable low latency communication service, a configuration message to configure transmission of a physical uplink control channel for the ultra-reliable low latency communication service. The one or more instructions, when executed by the one or more processors of the base station, may cause the one or more processors to receive a plurality of repetitions of the physical uplink control channel transmitted in a single slot based at least in part on transmitting the configuration message.

In some aspects, an apparatus for wireless communication may include means for transmitting, in connection with an ultra-reliable low latency communication service, a configuration message to configure transmission of a physical uplink control channel for the ultra-reliable low latency communication service. The apparatus may include means for receiving a plurality of repetitions of the physical uplink control channel transmitted in a single slot based at least in part on transmitting the configuration message.

Aspects generally include a method, device, apparatus, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
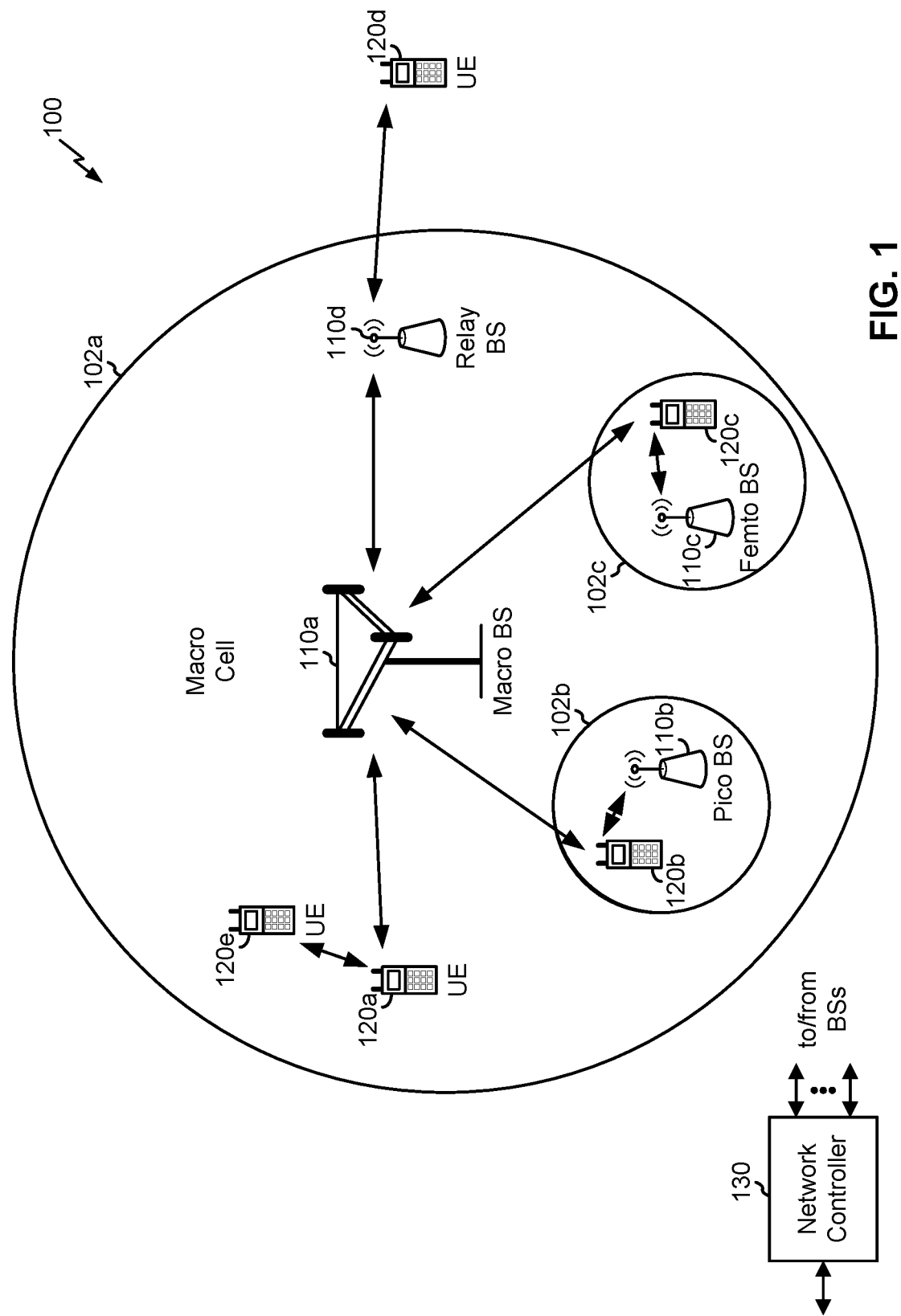
FIG. 1 is a block diagram conceptually illustrating an example of a wireless communication network, in accordance with various aspects of the present disclosure.

In some communications systems, such as NR or 5G, a user equipment (UE) may transmit information to a base station (BS) using one or more frequencies. For example, in a frequency hopping communication system, a UE may transmit a first portion of a physical uplink control channel (PUCCH) using resources of a first frequency location, may transfer to a second frequency location, and may transmit a second portion of the PUCCH using resources of the second frequency location. In this case, during a first slot, the UE may transmit portions of a first repetition of the PUCCH, which may be termed a first repetition of the PUCCH, and may, in a second slot, transmit a second repetition of the same PUCCH, which may be termed a second repetition of the PUCCH. However, for low latency communications, such as for ultra-reliable low latency communication (URLLC), transmission of repetitions in multiple slots may, in some instances, not satisfy reliability or latency requirements of URLLC, and/or the like.

Some implementations described herein may enable PUCCH repetition in a single slot. For example, a UE may transmit, to a BS, a first repetition of the PUCCH (e.g., a first repetition) and a second repetition of the PUCCH (e.g., a second repetition) in a single slot, thereby satisfying a reliability requirement of URLLC, satisfying a latency requirement of URLLC, and/or the like. Moreover, in some aspects, the UE may perform multiple frequency hops in a single slot (e.g., to transmit repetitions of the PUCCH via more than two frequencies), thereby increasing frequency diversity, which may result in an increase in PUCCH reliability to enable the UE to satisfy the reliability requirement of URLLC. In this way, the UE and the BS may enable URLLC service for frequency hopping communications systems. Moreover, aspects described herein may improve performance for same-slot repetition relative to other techniques. For example, by using a flexible repetition configuration (e.g., rather than fixed repetitions), the UE may improve reliability and latency performance. Moreover, by using a common mother code for different repetitions, the UE may enable soft-combining at the BS, which may improve performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs 120 may be associated with a reliability requirement, such as for ultra-reliable low latency communication (URLLC) service. A UE 120a may communicate with macro BS 110a to receive a configuration message to configure transmission of physical uplink control channel (PUCCH) repetitions. For example, UE 120a may be configured to transmit a plurality of PUCCH repetitions in a single slot, to transmit a PUCCH repetition that extends across a slot boundary from a first slot to a second slot, to frequency hop to transmit PUCCH repetitions on different frequency bands, and/or the like. In this way, UE 120a may increase flexibility with regard to PUCCH repetition transmission, thereby increasing reliability to satisfy a reliability requirement of, for example, URLLC.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
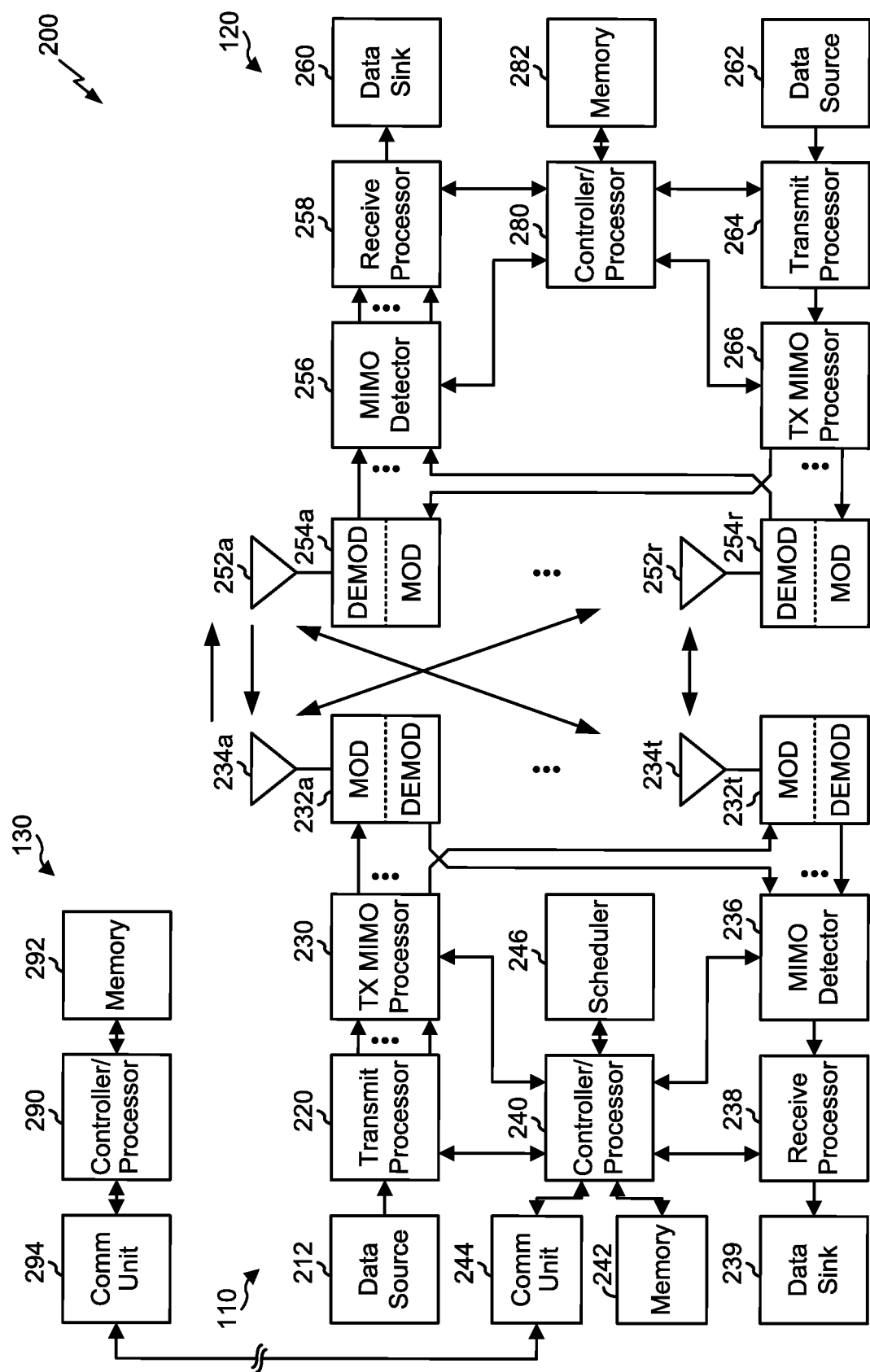
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), etc.) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. The transmit chain of base station 110 (e.g., controller/processor 240, transmit process 220, TX MIMO processor 230, modulator 232, antenna 234, and/or the like) may transmit a configuration message to configure PUCCH repetition for a URLLC service, as described in more detail herein. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. For example, a receive chain of UE 120 (e.g., antenna 252, demodulator 254, MIMO detector 256, receive processor 258, controller/processor 280) may receive a configuration message from BS 110 configuring PUCCH repetition for URLLC service. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. In this case, a transmit chain of UE 120 (e.g., controller/processor 280, transmit processor 264, TX MIMO processor 266, modulator 254, antenna 252, and/or the like) may transmit a plurality of repetitions of a PUCCH in a single slot, may transmit a repetition of the PUCCH that crosses a slot boundary, may enable frequency hopping to transmit repetitions of the PUCCH using different frequency bands, and/or the like. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. For example, the receive chain of base station 110 (e.g., controller/processor 240, receive processor 238, MIMO detector 236, demodulator 232, antenna 234, and/or the like) may receive a plurality of PUCCH repetitions, as described herein. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with physical uplink control channel repetition, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

Figure 6:
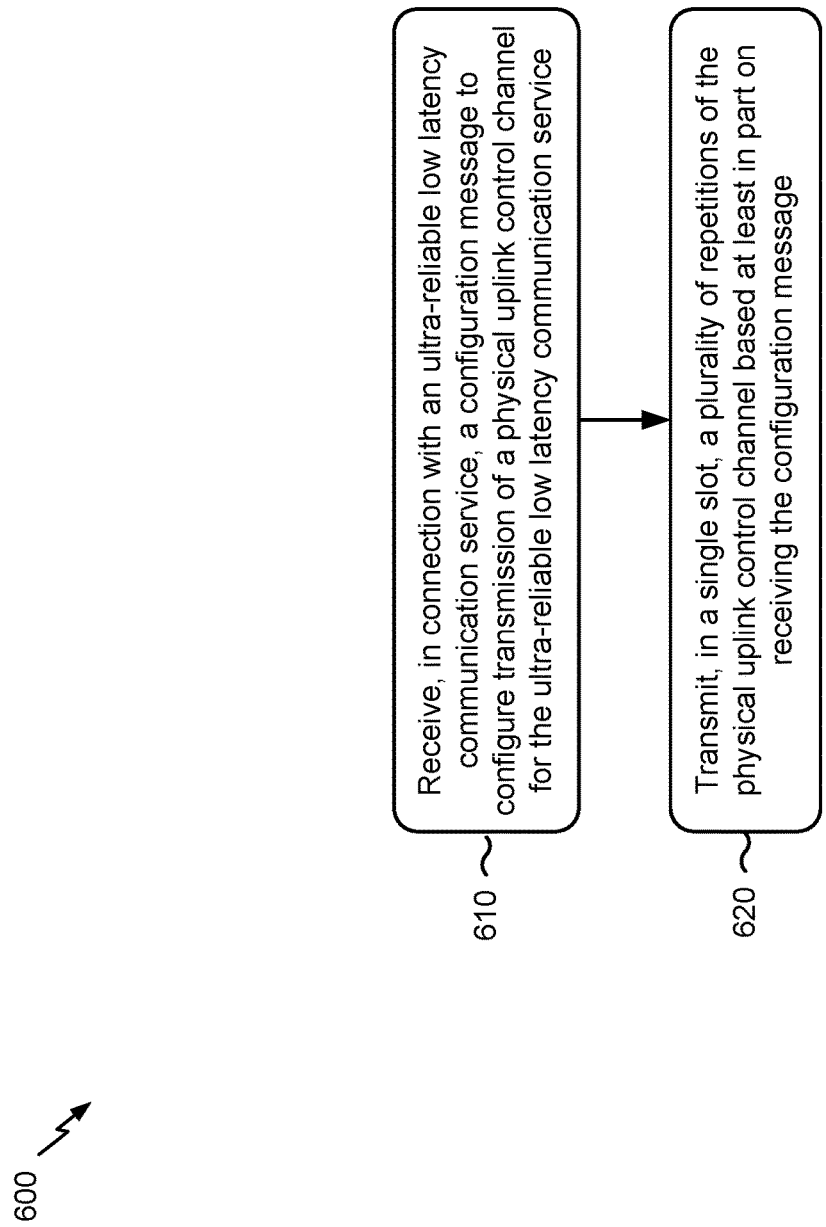
FIG. 6 is a diagram illustrating an example process performed, for example, by a user equipment, in accordance with various aspects of the present disclosure.

The stored program codes, when executed by controller/processor 280 and/or other processors and modules at UE 120, may cause the UE 120 to perform operations described with respect to process 600 of FIG. 6 and/or other processes as described herein. The stored program codes, when executed by controller/processor 240 and/or other processors and modules at base station 110, may cause the base station 110 to perform operations described with respect to process 700 of FIG. 7 and/or other processes as described herein. A scheduler 246 may schedule UEs for data transmission on the downlink and/or uplink.

In some aspects, UE 120 may include means for receiving, in connection with an ultra-reliable low latency communication service, a configuration message to configure transmission of a physical uplink control channel for the ultra-reliable low latency communication service, means for transmitting, in a single slot, a plurality of repetitions of the physical uplink control channel based at least in part on receiving the configuration message, and/or the like. In some aspects, such means may include one or more components of UE 120 described in connection with FIG. 2. For example, the receive chain of UE 120 may provide means for receiving the configuration message, as described above, and the transmit chain of UE 120 may provide means for transmitting the plurality of repetitions, as described above.

In some aspects, base station 110 may include means for transmitting, in connection with an ultra-reliable low latency communication service, a configuration message to configure transmission of a physical uplink control channel for the ultra-reliable low latency communication service, means for receiving a plurality of repetitions of the physical uplink control channel transmitted in a single slot based at least in part on transmitting the configuration message, and/or the like. In some aspects, such means may include one or more components of base station 110 described in connection with FIG. 2. For example, the transmit chain of base station 110 may provide means for transmitting the configuration message, as described above, and the receive chain of base station 110 may provide means for receiving the plurality of repetitions, as described above.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
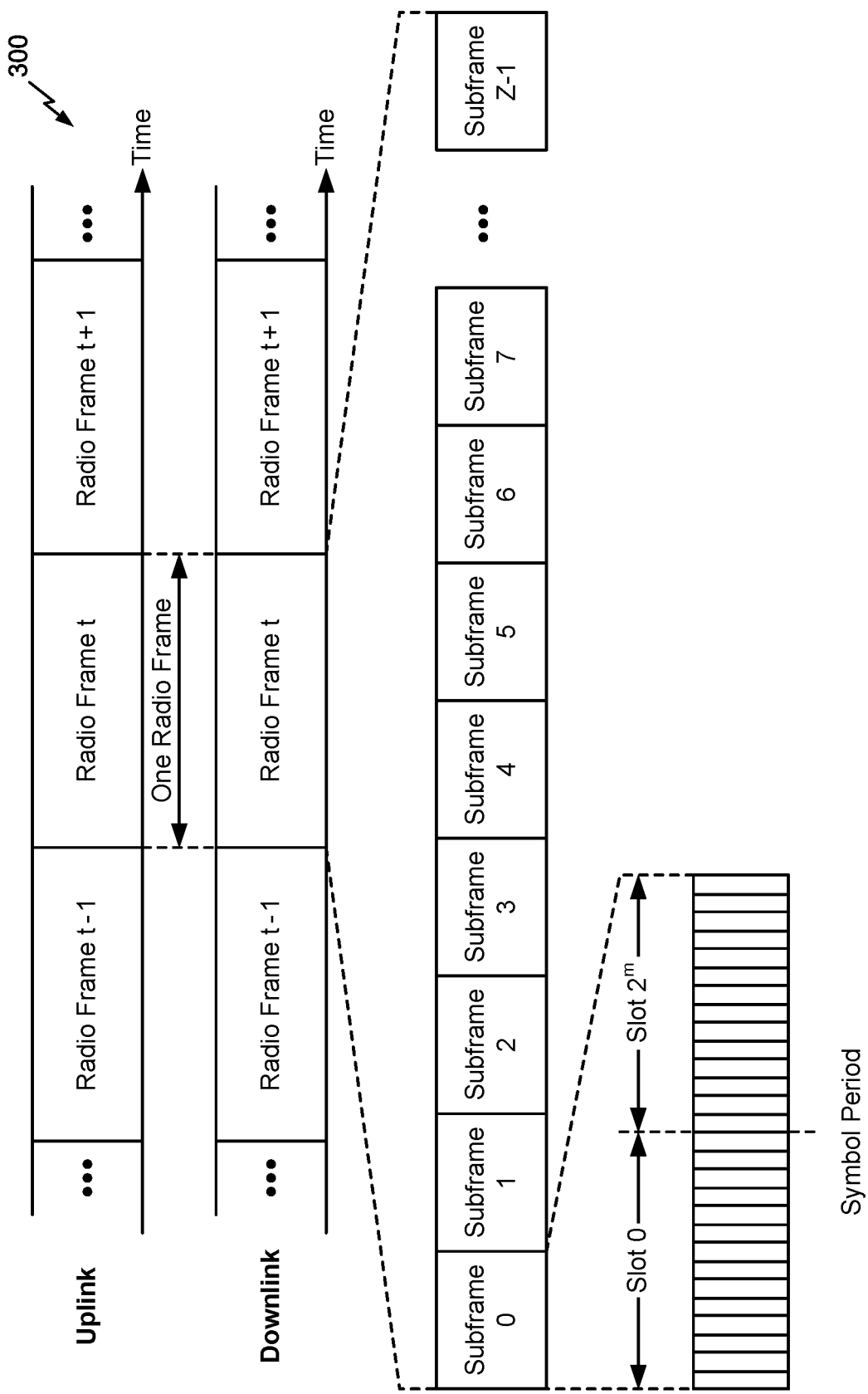
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In some aspects, UE 120 may transmit a plurality of repetitions of a PUCCH during a single slot. In some aspects, UE 120 may transmit a repetition of a PUCCH that crosses a slot boundary (e.g., from a first slot to a second slot). In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

As indicated above, FIG. 3 is provided as an example. Other examples may differ from what is described with regard to FIG. 3.

Figure 4:
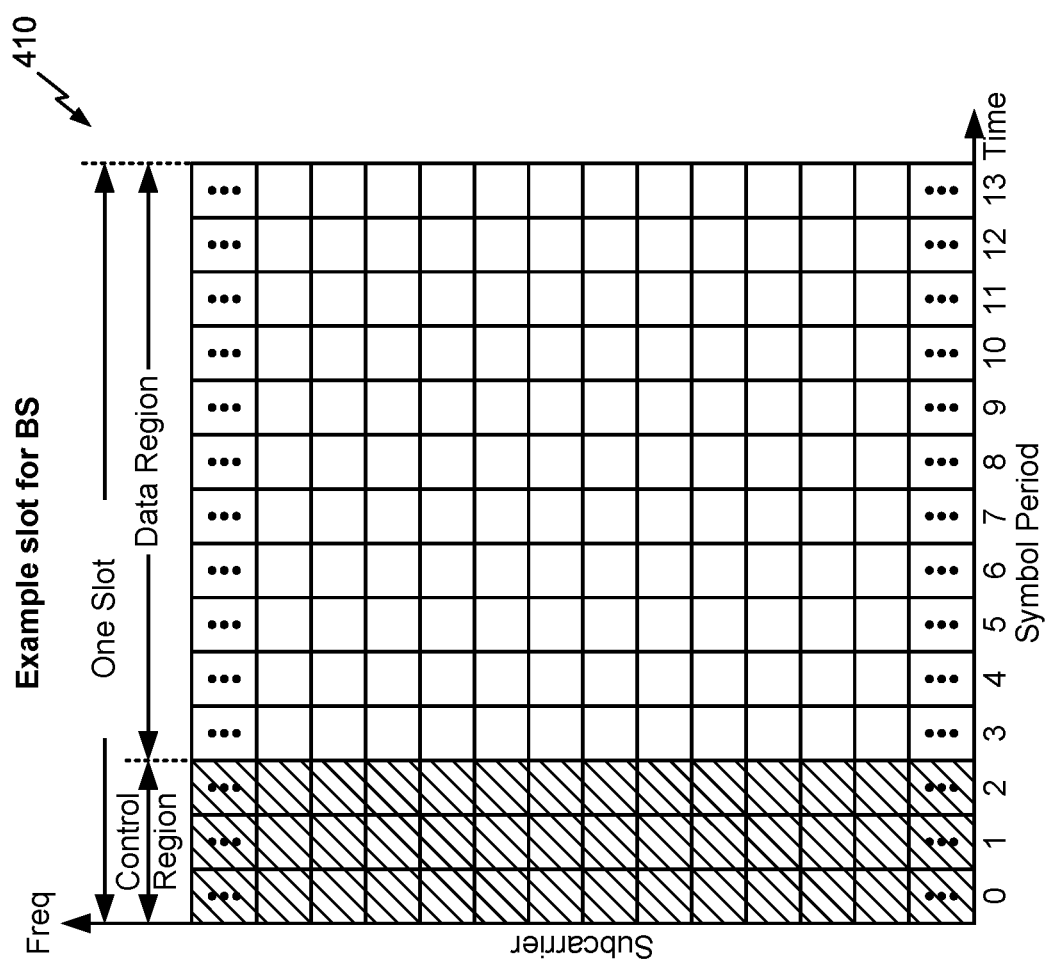
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q–1 may be defined, where Q may be equal to 4, 6, 8, 10, or some other value. Each interlace may include slots that are spaced apart by Q frames. In particular, interlace q may include slots q, q+Q, q+2Q, etc., where q E {0, . . . , Q–1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 ms duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
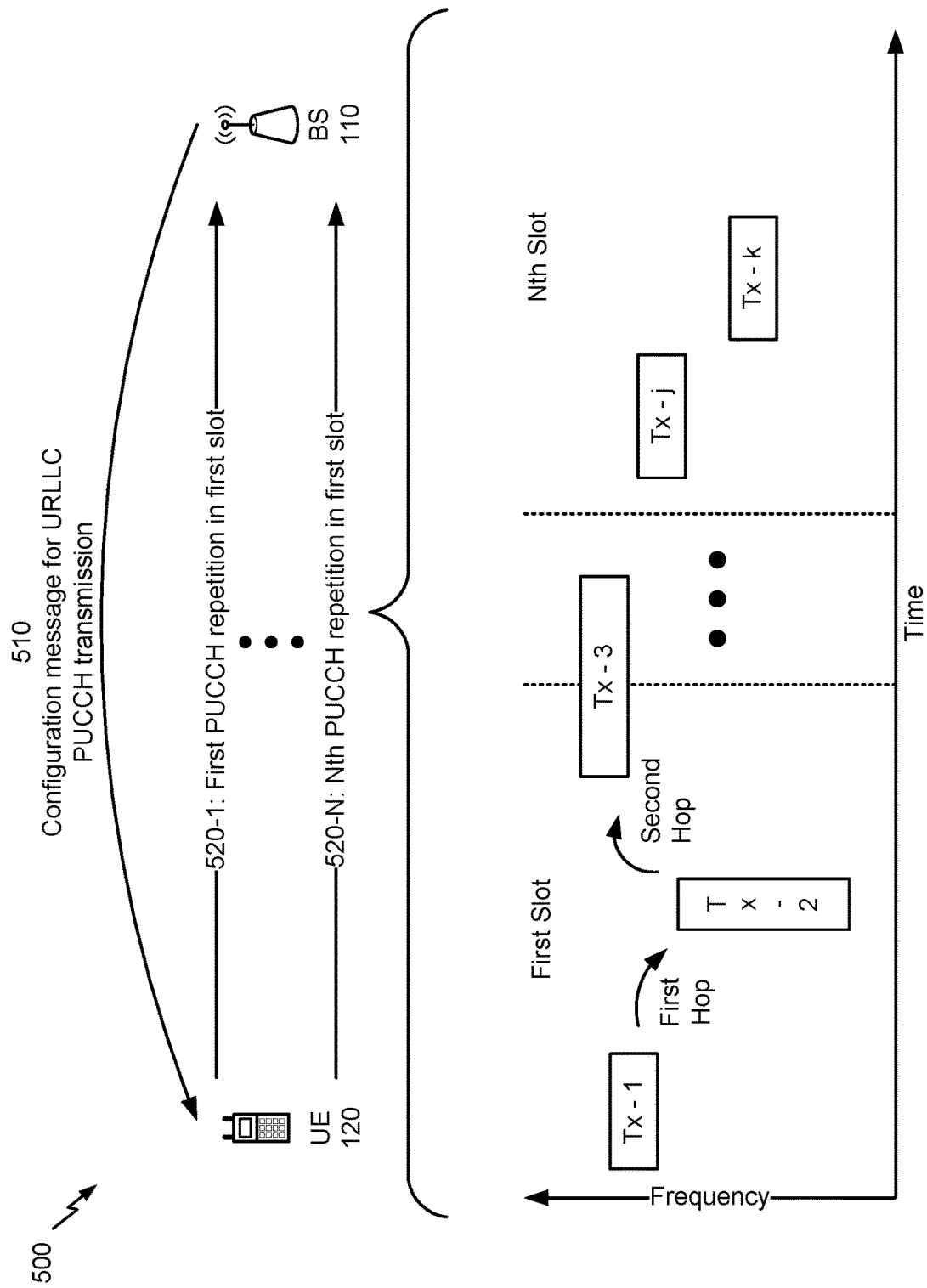
FIG. 5 is a diagram illustrating an example of physical uplink control channel repetition, in accordance with various aspects of the present disclosure.

FIG. 5 is a diagram illustrating an example 500 of physical uplink control channel repetition, in accordance with various aspects of the present disclosure. As shown in FIG. 5, example 500 may include a BS 110 and a UE 120.

As further shown in FIG. 5, and by reference number 510, BS 110 may transmit, and UE 120 may receive, a configuration message for URLLC PUCCH transmission. For example, BS 110 may determine that UE 120 is to transmit a plurality of repetitions of a PUCCH transmission in a single slot to satisfy a URLLC reliability requirement.

As further shown in FIG. 5, and by reference numbers 520-1 through 520-N (N>1), UE 120 may transmit a plurality of repetitions of a PUCCH in a single slot, and BS 110 may receive the plurality of repetitions of the PUCCH transmitted in the single slot. For example, UE 120 may transmit a first transmission of a repetition of a PUCCH (Tx–1) in a first slot, a second transmission of a repetition of the PUCCH (Tx–2) in the first slot, . . . , an nth transmission of a repetition of the PUCCH in the first slot, and/or the like. In some aspects, BS 110 may receive each repetition of the PUCCH in the single slot. In some aspects, BS 110 may receive a first repetition in a first slot and a second repetition in a second slot. In some aspects, UE 120 may transmit the plurality of repetitions of the PUCCH based at least in part on receiving a downlink control information (DCI) message from BS 110.

In some aspects, UE 120 may transmit a repetition of the PUCCH that crosses a slot boundary (e.g., from a first slot to a second slot). For example, UE 120 may transmit a third transmission of a repetition of the PUCCH (Tx–3) partially in the first slot and partially in a second slot. In some aspects, UE 120 may transmit the plurality of repetitions of the PUCCH using a plurality of different frequency resources. For example, UE 120 may transmit the first repetition using first resources associated with a first frequency location, the second repetition using second resources associated with a second frequency location, the third repetition using third resources associated with a third frequency location, and/or the like. In this way, UE 120 increases frequency diversity, thereby improving reliability of the PUCCH.

In some aspects, UE 120 may perform a plurality of frequency hops in a single slot to transmit the plurality of repetitions of the PUCCH. For example, UE 120 may transmit the first repetition (shown as TX–1), transfer from the first frequency location to the second frequency location, transmit the second repetition (shown as TX–2), transfer from the second frequency location to the third frequency location, and transmit a portion of the third repetition (shown as TX–3) in the first slot. In some aspects, UE 120 may use different resource assignments for each repetition of the PUCCH. For example, UE 120 may use a first quantity of symbols and/or resource blocks to transmit the first repetition and may use a second quantity of symbols and/or resource blocks to transmit the second repetition. In some aspects, the first quantity may be the same or different than the second quantity. In this way, UE 120 may further increase flexibility with regard to transmitting repetitions of the PUCCH, thereby increasing reliability of the PUCCH.

In some aspects, UE 120 may use different PUCCH formats to encode the plurality of repetitions. For example, UE 120 may transmit the first repetition as a first type of PUCCH (e.g., a short PUCCH or a PUCCH format type 0) to reduce latency relative to other types of PUCCH formats, and may transmit the second repetition as a second type of PUCCH (e.g., a long PUCCH or a PUCCH format type 1) to increase reliability relative to other types of PUCCH formats, thereby satisfying requirements associated with URLLC service relating to latency and/or reliability.

In some aspects, UE 120 may use different PUCCH payload encoding for different instances of a set of repetitions. For example, UE 120 may encode payload of the first repetition using a first code rate and/or a first redundancy version identifier (RVID), and may encode payload of the second repetition (e.g., a repetition of a same payload as the first payload) using a second code rate and/or a second RVID. Although some aspects are described herein in terms of a repetition (e.g., of a PUCCH transmission). A repetition may be associated with a different configuration, such as a different encoding, a different frequency, and/or the like, and may include a common payload with a transmission that the repetition is repeating. Further, a single transmission (e.g., a sequentially first transmission) may be referred to as a repetition in a context of the transmission subsequently being repeated.

In some communication systems, such as NR, a mother polar code may have a length equal to a power of 2 (e.g., 32, 64, 128, and/or the like). A UE may first determine a length of the mother polar code based at least in part on the payload size, and a quantity of resource elements in a scheduled PUCCH resource. The UE may then encode the payload into a coded bit steam using the mother polar code. Finally, the UE may obtain coded bits of a desired length by using rate matching techniques (e.g., a repetition procedure, a shortening procedure, a puncturing procedure, and/or the like). However, this procedure may result in the UE using mother polar codes with different lengths and using different rate matching techniques for the different repetitions of a PUCCH transmission, which may prevent a receiver (e.g., a BS) from soft combining the different PUCCH repetitions. Thus, in some aspects, UE 120 may use a common mother polar code for the plurality of repetitions, described above. For example, when payload size is greater than or equal to 12 bits and UE 120 uses a polar code for encoding, UE 120 may encode different PUCCH repetitions using a common mother polar code, a common rate matching procedure (e.g., a repetition procedure, a shortening procedure, a puncturing procedure, and/or the like), and/or the like to enable soft-combining of different PUCCH repetitions.

In some aspects, the rate matching procedure may be common across different repetitions and UE 120 may use different rate matching behaviors for each repetition (and the same rate matching procedure). For example, UE 120 may use, for example, puncturing for each repetition, but may puncture a first quantity of bits from bits of mother polar code into a first repetition and may puncture a second quantity of buts from the same bits of the mother polar code into a second repetition. Similarly, UE 120 may use shortening for each repetition but may use different parameters for shortening. As an example of puncturing, a first repetition may include a quantity of polar encoded bits punctured, and a second repetition may have a different quantity of polar encoded bits punctured (e.g., as a result of a different quantity of resource blocks being assigned to each repetition). Additionally, or alternatively, UE 120 may use a common PUCCH payload encoding for different repetitions. In some aspects, UE 120 may jointly encode each PUCCH repetition of a single slot. For example, for a set of two repetitions, each with 1 resource block, 12 tones, and 12 symbols (e.g., 144 resource elements), UE 120 may use quadrature phase shift keying (QPSK) to jointly encode the 288 total resource elements. In this case, for 2 encoded bits per resource element, UE 120 may encode 576 total bits jointly across the two PUCCH repetitions using a common coding rate and a common RVID, and may transmit the jointly encoded 576 bits.

In some aspects, UE 120 may use a demodulation reference signal (DMRS) in connection with the PUCCH. For example, UE 120 may use a DMRS, and may perform DMRS sequence hopping for each repetition of the PUCCH (e.g., a different DMRS sequence used for each repetition). In this way, UE 120 may reduce inter-cell interference to improve network performance. Additionally, or alternatively, UE 120 may perform DMRS position hopping for each repetition of the PUCCH (e.g., a different DMRS position used for each repetition). In this way, UE 120 may randomize inter-cell interference to improve network performance. Additionally, or alternatively, UE 120 may perform DMRS pattern hopping for each repetition of the PUCCH (e.g., a different DMRS pattern, DMRS configuration, DMRS density, and/or the like used for each repetition). In this way, UE 120 may improve flexibility of the DMRS, thereby improving reliability to improve network performance.

As indicated above, FIG. 5 is provided as an example. Other examples may differ from what is described with respect to FIG. 5.

FIG. 6 is a diagram illustrating an example process 600 performed, for example, by a UE, in accordance with various aspects of the present disclosure. Example process 600 is an example where a UE (e.g., UE 120) performs physical uplink control channel repetition.

As shown in FIG. 6, in some aspects, process 600 may include receiving, in connection with an ultra-reliable low latency communication service, a configuration message to configure transmission of a physical uplink control channel for the ultra-reliable low latency communication service (block 610). For example, the UE (e.g., using antenna 252, DEMOD 254, MIMO detector 256, receive processor 258, controller/processor 280, and/or the like) may receive, in connection with the ultra-reliable low latency communication service, the configuration message to configure transmission of the physical uplink control channel for the ultra-reliable low latency communication service, as described above.

As shown in FIG. 6, in some aspects, process 600 may include transmitting, in a single slot, a plurality of repetitions of the physical uplink control channel based at least in part on receiving the configuration message (block 620). For example, the UE (e.g., using controller/processor 280, transmit processor 264, TX MIMO processor 266, MOD 254, antenna 252, and/or the like) may transmit, in the single slot, the plurality of repetitions of the physical uplink control channel based at least in part on receiving the configuration message, as described above.

Process 600 may include additional aspects, such as any single aspect or any combination of aspects described below and/or in connection with one or more other processes described elsewhere herein.

In a first aspect, the UE is configured to transmit another repetition of the physical uplink control channel, partially during the single slot and partially during another slot.

In a second aspect, alone or in combination with the first aspect, the UE is configured to frequency hop to transmit a first repetition, of the plurality of repetitions, using a first frequency and a second repetition, of the plurality of repetitions, using a second frequency.

In a third aspect, alone or in combination with one or more of the first and second aspects, the UE is configured to perform a plurality of frequency hops to transmit the plurality of repetitions.

In a fourth aspect, alone or in combination with one or more of the first through third aspects, a first repetition, of the plurality of repetitions, is associated with a first quantity of symbols or resource blocks and a second repetition, of the plurality of repetitions, is associated with a second quantity of symbols or resource blocks that is different from the first quantity of symbols or resource blocks.

In a fifth aspect, alone or in combination with one or more of the first through fourth aspects, a first repetition, of the plurality of repetitions, is associated with a first physical uplink control channel format and a second repetition, of the plurality of repetitions, is associated with a second physical uplink control channel format.

In a sixth aspect, alone or in combination with one or more of the first through fifth aspects, the first physical uplink control channel format is a short physical uplink control channel and the second physical uplink control channel format is a long physical uplink control channel format.

In a seventh aspect, alone or in combination with one or more of the first through sixth aspects, the first physical uplink control channel format is a physical uplink control channel format type 0 and the second physical uplink control channel format is a physical uplink control channel format type 1.

In an eighth aspect, alone or in combination with one or more of the first through seventh aspects, a first payload of a first repetition, of the plurality of repetitions, is encoded using a first code rate or a first redundancy version identifier, and a second payload of a second repetition, of the plurality of repetitions, is associated with a second code rate that is different than the first code rate, or a second redundancy version identifier that is different from the first redundancy version identifier.

In a ninth aspect, alone or in combination with one or more of the first through eighth aspects, the first payload and the second payload are a same payload.

In a tenth aspect, alone or in combination with one or more of the first through ninth aspects, two or more payloads associated with two or more repetitions, of the plurality of repetitions, are encoded using a common mother polar code or a common rate matching procedure.

In an eleventh aspect, alone or in combination with one or more of the first through tenth aspects, the UE is configured to use a plurality of demodulation reference signal sequences for the plurality of repetitions.

In a twelfth aspect, alone or in combination with one or more of the first through eleventh aspects, the UE is configured to use a plurality of demodulation reference signal positions for the plurality of repetitions.

In a thirteenth aspect, alone or in combination with one or more of the first through twelfth aspects, the UE is configured to use, for the plurality of repetitions, a plurality of at least one of: demodulation reference signal patterns, demodulation reference signal configurations, or demodulation reference signal densities.

In a fourteenth aspect, alone or in combination with one or more of the first through thirteenth aspects, the plurality of repetitions of the physical uplink control channel in the single slot are jointly encoded using a common code rate and a common redundancy version identifier.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
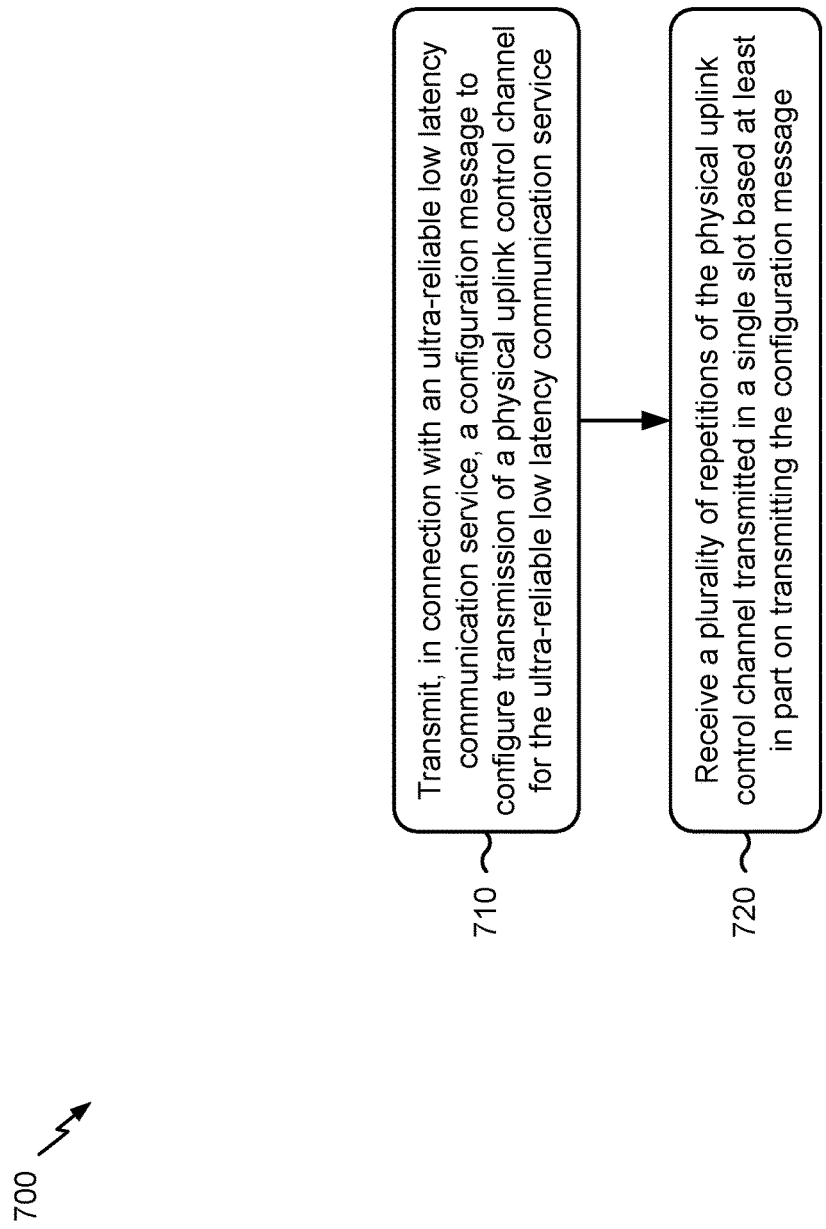
FIG. 7 is a diagram illustrating an example process performed, for example, by a base station, in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) enables physical uplink control channel repetition.

As shown in FIG. 7, in some aspects, process 700 may include transmitting, in connection with an ultra-reliable low latency communication service, a configuration message to configure transmission of a physical uplink control channel for the ultra-reliable low latency communication service (block 710). For example, the BS (e.g., using controller/processor 240, transmit processor 220, TX MIMO processor 230, MOD 232, antenna 234, and/or the like) may transmit, in connection with the ultra-reliable low latency communication service, the configuration message to configure repetition of the physical uplink control channel for the ultra-reliable low latency communication service, as described above.

As shown in FIG. 7, in some aspects, process 700 may include receiving a plurality of repetitions of the physical uplink control channel transmitted in a single slot based at least in part on transmitting the configuration message (block 720). For example, the BS (e.g., using antenna 234, DEMOD 232, MIMO detector 236, receive processor 238, controller/processor 240, and/or the like) may receive the plurality of repetitions of the physical uplink control channel transmitted in the single slot based at least in part on transmitting the configuration message, as described above.

Process 700 may include additional aspects, such as any single aspect or any combination of aspects described below and/or in connection with one or more other processes described elsewhere herein.

In a first aspect, the BS is configured to receive at least one repetition, of the plurality of repetitions, transmitted partially during the single slot and partially during another slot.

In a second aspect, alone or in combination with the first aspect, the BS is configured to frequency hop to receive a first repetition, of the plurality of repetitions, using a first frequency and a second repetition, of the plurality of repetitions, using a second frequency.

In a third aspect, alone or in combination with one or more of the first and second aspects, the BS is configured to perform a plurality of frequency hops to receive the plurality of repetitions.

In a fourth aspect, alone or in combination with one or more of the first through third aspects, a first repetition, of the plurality of repetitions, is associated with a first quantity of symbols or resource blocks, and a second repetition, of the plurality of repetitions, is associated with a second quantity of symbols or resource blocks that is different from the first quantity of symbols or resource blocks.

In a fifth aspect, alone or in combination with one or more of the first through fourth aspects, a first repetition, of the plurality of repetitions, is associated with a first physical uplink control channel format, and a second repetition, of the plurality of repetitions, is associated with a second physical uplink control channel format.

In a sixth aspect, alone or in combination with one or more of the first through fifth aspects, the first physical uplink control channel format is a short physical uplink control channel and the second physical uplink control channel format is a long physical uplink control channel format.

In a seventh aspect, alone or in combination with one or more of the first through sixth aspects, the first physical uplink control channel format is a physical uplink control channel format type 0 and the second physical uplink control channel format is a physical uplink control channel format type 1.

In an eighth aspect, alone or in combination with one or more of the first through seventh aspects, a first payload of a first repetition, of the plurality of repetitions, is encoded using a first code rate or a first redundancy version identifier, and a second payload of a second repetition, of the plurality of repetitions, is associated with a second code rate that is different than the first code rate, or a second redundancy version identifier that is different from the first redundancy version identifier.

In a ninth aspect, alone or in combination with one or more of the first through eighth aspects, the first payload and the second payload are a same payload.

In a tenth aspect, alone or in combination with one or more of the first through ninth aspects, two or more payloads associated with two or more repetitions, of the plurality of repetitions, are encoded using a common mother polar code or a common rate matching procedure.

In an eleventh aspect, alone or in combination with one or more of the first through tenth aspects, the BS is configured to use a plurality of demodulation reference signal sequences for the plurality of repetitions.

In a twelfth aspect, alone or in combination with one or more of the first through eleventh aspects, the BS is configured to use a plurality of demodulation reference signal positions for the plurality of repetitions.

In a thirteenth aspect, alone or in combination with one or more of the first through twelfth aspects, the BS is configured to use, for the plurality of repetitions, a plurality of at least one of: demodulation reference signal patterns, demodulation reference signal configurations, or demodulation reference signal densities.

In a fourteenth aspect, alone or in combination with one or more of the first through thirteenth aspects, the plurality of repetitions of the physical uplink control channel in the single slot are jointly encoded using a common code rate and a common redundancy version identifier.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, in connection with an ultra-reliable low latency communication service, a configuration message to configure repetition for the ultra-reliable low latency communication service; and
transmitting a plurality of repetitions based at least in part on receiving the configuration message, wherein a first repetition, of the plurality repetitions, extends across a slot boundary from a first slot to a second slot, and wherein the first repetition is associated with a first quantity of symbols and a second repetition, of the plurality of repetitions, is associated with a second quantity of symbols that is different from the first quantity of symbols.

2. The method of claim 1,
wherein transmitting the plurality of repetitions comprises:
frequency hopping to transmit the first repetition using a first frequency and the second repetition using a second frequency.

3. The method of claim 1, wherein transmitting the plurality of repetitions comprises:
performing a plurality of frequency hops to transmit the plurality of repetitions.

4. The method of claim 1,
wherein the first repetition is associated with a first physical uplink control channel format and the second repetition is associated with a second physical uplink control channel format.

5. The method of claim 4, wherein the first physical uplink control channel format is a short physical uplink control channel and the second physical uplink control channel format is a long physical uplink control channel format.

6. The method of claim 4, wherein the first physical uplink control channel format is a physical uplink control channel format type 0 and the second physical uplink control channel format is a physical uplink control channel format type 1.

7. The method of claim 1,
wherein a first payload of the first repetition is encoded using a first code rate or a first redundancy version identifier and a second payload of the second repetition is associated with a second code rate that is different than the first code rate or a second redundancy version identifier that is different from the first redundancy version identifier.

8. The method of claim 7, wherein the first payload and the second payload are a same payload.

9. The method of claim 1, wherein two or more payloads associated with two or more repetitions, of the plurality of repetitions, are encoded using a common mother polar code or a common rate matching procedure.

10. The method of claim 1, wherein the UE is configured to use a plurality of demodulation reference signal sequences for the plurality of repetitions.

11. The method of claim 1, wherein the UE is configured to use a plurality of demodulation reference signal positions for the plurality of repetitions.

12. The method of claim 1, wherein the UE is configured to use, for the plurality of repetitions, a plurality of at least one of: demodulation reference signal patterns, demodulation reference signal configurations, or demodulation reference signal densities.

13. The method of claim 1, wherein two or more repetitions, of the plurality of repetitions, are jointly encoded using a common code rate and a common redundancy version identifier.

14. The method of claim 1,
wherein the first repetition in a single slot is associated with a first physical uplink control channel format and the second repetition in the single slot is associated with a second physical uplink control channel format.

15. The method of claim 1, further comprising:
transmitting at least one other repetition based at least in part on receiving the configuration message,
wherein the first repetition is associated with a first physical uplink control channel format and the at least one other repetition is associated with a second physical uplink control channel format.

16. The method of claim 1, wherein the first quantity of symbols comprises orthogonal frequency division multiplexing (OFDM) symbols.

17. A method of wireless communication performed by a network entity, comprising:
transmitting, in connection with an ultra-reliable low latency communication service, a configuration message to configure repetition for the ultra-reliable low latency communication service; and
receiving a plurality of repetitions transmitted based at least in part on transmitting the configuration message, wherein a first repetition, of the plurality repetitions, extends across a slot boundary from a first slot to a second slot, and wherein the first repetition is associated with a first quantity of symbols and a second repetition, of the plurality of repetitions, is associated with a second quantity of symbols that is different from the first quantity of symbols.

18. The method of claim 17,
wherein the receiving the plurality of repetitions comprises:
frequency hopping to receive the first repetition using a first frequency and the second repetition using a second frequency.

19. The method of claim 17, wherein receiving the plurality of repetitions comprises:
performing a plurality of frequency hops to receive the plurality of repetitions.

20. The method of claim 16,
wherein the first repetition is associated with a first physical uplink control channel format and the second repetition is associated with a second physical uplink control channel format.

21. The method of claim 20, wherein the first physical uplink control channel format is a short physical uplink control channel and the second physical uplink control channel format is a long physical uplink control channel format.

22. The method of claim 20, wherein the first physical uplink control channel format is a physical uplink control channel format type 0 and the second physical uplink control channel format is a physical uplink control channel format type 1.

23. The method of claim 16,
wherein a first payload of the first repetition is encoded using a first code rate or a first redundancy version identifier and a second payload of the second repetition is associated with a second code rate that is different than the first code rate or a second redundancy version identifier that is different from the first redundancy version identifier.

24. The method of claim 23, wherein the first payload and the second payload are a same payload.

25. The method of claim 16, wherein two or more payloads associated with two or more repetitions, of the plurality of repetitions, are encoded using a common mother polar code or a common rate matching procedure.

26. The method of claim 16, wherein the BS is configured to use a plurality of demodulation reference signal sequences for the plurality of repetitions.

27. The method of claim 16, wherein the BS is configured to use a plurality of demodulation reference signal positions for the plurality of repetitions.

28. The method of claim 17, wherein the first quantity of symbols comprises orthogonal frequency division multiplexing (OFDM) symbols.

29. A user equipment (UE) for wireless communication, comprising:
a memory; and
one or more processors, coupled to the memory, configured to:
receive, in connection with an ultra-reliable low latency communication service, a configuration message to configure repetition for the ultra-reliable low latency communication service; and
transmit a plurality of repetitions based at least in part on receiving the configuration message, wherein a first repetition, of the plurality repetitions, extends across a slot boundary from a first slot to a second slot, and wherein the first repetition is associated with a first quantity of symbols and a second repetition, of the plurality of repetitions, is associated with a second quantity of symbols that is different from the first quantity of symbols.

30. The UE of claim 29, wherein the first repetition is a repetition of a physical uplink control channel.

31. The UE of claim 29,
wherein the first repetition is associated with a first format, and
wherein the second repetition is associated with a second format.

32. The UE of claim 29, wherein the first quantity of symbols comprises orthogonal frequency division multiplexing (OFDM) symbols.

33. The UE of claim 29, wherein the one or more processors, to transmit the plurality of repetitions, are configured to:
frequency hop to transmit the first repetition using a first frequency and the second repetition using a second frequency.

34. The UE of claim 29, wherein the one or more processors, to transmit the plurality of repetitions, are configured to:
perform a plurality of frequency hops to transmit the plurality of repetitions.

35. A base station (BS) for wireless communication, comprising:
a memory; and
one or more processors, coupled to the memory, configured to:
transmit, in connection with an ultra-reliable low latency communication service, a configuration message to configure repetition for the ultra-reliable low latency communication service; and
receive a plurality of repetitions transmitted based at least in part on transmitting the configuration message, wherein a first repetition, of the plurality repetitions, extends across a slot boundary from a first slot to a second slot, and wherein the first repetition is associated with a first quantity of symbols and a second repetition, of the plurality of repetitions, is associated with a second quantity of symbols that is different from the first quantity of symbols.

36. The network entity of claim 35, wherein the first quantity of symbols comprises orthogonal frequency division multiplexing (OFDM) symbols.

37. The network entity of claim 35, wherein the one or more processors, to receive the plurality of repetitions, are configured to:
perform a plurality of frequency hops to receive the plurality of repetitions.

* * * * *